US007327633B2

(12) United States Patent  
Bagaini et al.

(10) Patent No.: US 7,327,633 B2  
(45) Date of Patent: Feb. 5, 2008

(54) SYSTEMS AND METHODS FOR ENHANCING LOW-FREQUENCY CONTENT IN VIBROSEIS ACQUISITION

(75) Inventors: Claudio Bagaini, Cottenham (GB); Timothy Dean, Chislehurst (GB); John Quigley, Redhill (GB); Glen-Allan Tite, Stafford, TX (US)

(73) Assignee: Westerneco L.L.C., Houston, TX (US)

(*) Notice: Subject to any disclaimer, the term of this patent is extended or adjusted under 35 U.S.C. 154(b) by 32 days.

(21) Appl. No.: 11/299,411

(22) Filed: Dec. 12, 2005

(65) Prior Publication Data

US 2007/0133354 A1    Jun. 14, 2007

(51) Int. Cl.  
*G01V 1/00* (2006.01)
(52) U.S. Cl. .......................................... 367/45; 702/17
(58) Field of Classification Search ................ 367/45; 702/17  
See application file for complete search history.

(56) References Cited

U.S. PATENT DOCUMENTS 3,815,704 A    6/1974  Eisner  
4,750,157 A *  6/1988  Shei ........................... 367/45  
6,035,257 A *  3/2000  Epperson .................... 702/17

FOREIGN PATENT DOCUMENTS

GB    2 416 033 A    1/2006

OTHER PUBLICATIONS

Lerwill, The amplitude and phase response of a seismic vibrator Geophysical prospecting, vol. 29, 1981, pp. 503-528.  
Rietsch, Vibroseis signals with pescribed power spectrum Geophysical prospecting, vol. 25, 1977, pp. 613-620.

* cited by examiner

*Primary Examiner*—Mark Hellner  
(74) *Attorney, Agent, or Firm*—Edward M. Bushard; Jody Lynn DeStefanis; Dale Gaudier

(57) ABSTRACT

This invention relates in general to vibroseis and, more specifically, but not by way of limitation, to the enhancement and/or signal strength optimization of low frequency content of seismic signals for use in surveying boreholes and/or subsurface earth formations. In embodiments of the present invention, physical properties of a seismic vibrator may be analyzed and used to provide for determination of a driving force necessary to drive a reaction mass to produce a sweep signal with enhanced low frequency content for injection into the ground for vibroseis. In certain aspects, the physical properties may be considered independent of any geophysical properties related to operation of the seismic vibrator.

22 Claims, 7 Drawing Sheets

SYSTEMS AND METHODS FOR ENHANCING LOW-FREQUENCY CONTENT IN VIBROSEIS ACQUISITION

BACKGROUND OF THE INVENTION

This invention relates in general to vibroseis and, more specifically, but not by way of limitation, to the enhancement and/or signal strength optimization of low frequency content of seismic signals for use in surveying boreholes and/or subsurface earth formations.

In the oil and gas industry, geophysical prospecting techniques are commonly used to aid in the search for and evaluation of subterranean hydrocarbon deposits. Generally, a seismic energy source is used to generate a seismic signal that propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

One type of geophysical prospecting utilizes an impulsive energy source, such as dynamite or a marine air gun, to generate the seismic signal. With an impulsive energy source, a large amount of energy is injected into the earth in a very short period of time. Accordingly, the resulting data generally have a relatively high signal-to-noise ratio, which facilitates subsequent data processing operations. On the other hand, use of an impulsive energy source can pose certain safety and environmental concerns.

Since the late 1950s and early 1960s, a new type of geophysical prospecting, generally known as "VIBROSEIS"® prospecting, has been used. Vibroseis prospecting employs a land or marine seismic vibrator as the energy source. In seismic surveys conducted on dry-land, a seismic vibrator imparts a signal into the earth having a much lower energy level then a signal generated by an impulsive energy source, however, the seismic vibrator can generate a signal for longer periods of time.

Vibrators for use in marine seismic surveying typically comprise a bell-shaped housing having a large and heavy diaphragm, equivalent to the aforementioned baseplate, in its open end. The vibrator is lowered into the water from a marine survey vessel, and the diaphragm is vibrated by a hydraulic drive system similar to that used in a land vibrator. Alternative marine vibrator designs comprise two solid curved or hemispherical shells, joined together by an elastic membrane. The hydraulic drive moves the two shells relative to one another in a similar manner to the movement of the reaction mass in a land vibrator. Marine vibrators are therefore subject to operational constraints analogous to those of land vibrators.

The seismic signal generated by a seismic vibrator is a controlled wavetrain—a sweep signal containing different frequencies—that may be emitted into the surface of the earth, a body of water or a borehole. In a seismic vibrator for use on land, energy may be imparted into the ground in a swept frequency signal. Typically the energy to be imparted into the ground is generated by a hydraulic drive system that vibrates a large weight, known as the reaction mass, up and down. The reaction mass is coupled to a baseplate that is in contact with the earth and through which the vibrations are transmitted into the earth. Very often, the baseplate is coupled with a large fixed weight, known as the hold-down weight that maintains contact between the baseplate and the ground as the reaction mass moves up and down. The seismic sweep produced by the seismic vibrator may be is a sinusoidal vibration of continuously varying frequency, increasing or decreasing monotonically within a given frequency range. Seismic sweeps often have durations between 2 and 20 seconds. The instantaneous frequency of the seismic sweep may vary linearly or nonlinearly with time. The ratio of the instantaneous frequency variation over the unit time interval is defined sweep rate. Further, the frequency of the seismic sweep may start low and increase with time—an upsweep—or it may begin high and gradually decrease—a downsweep.

The seismic data recorded during vibroseis prospecting (hereinafter referred to as "vibrator data") are composite signals, each consisting of many long, reflected wavetrains superimposed upon one another. Since these composite signals are typically many times longer than the interval between reflections, it is not possible to distinguish individual reflections from the recorded signal. However, when the seismic vibrator data is cross-correlated with the sweep signal (also known as the "reference signal"), the resulting correlated data approximates the data that would have been recorded if the source had been an impulsive energy source.

The amount of energy injected into the earth by a seismic vibrator during a conventional vibrator sweep is governed by the size of the vibrator and the duration of the sweep. There are several of constraints on the amplitude of the vibrations. The most basic of these is that the hold-down weight must exceed the maximum upward force, so that the vibrator never loses contact with the ground. However, there are other constraints on low frequency output. As already mentioned, the ground force is generated by vibrating the reaction mass and the baseplate. The force transmitted to the ground is equal the sum of the reaction mass and baseplate accelerations weighted by the reaction mass and baseplate mass respectively. At low frequencies, the main component to the ground force is by far that due to the reaction mass since the baseplate acceleration is negligible with respect to the reaction mass acceleration. As such, to generate the same ground force at low frequencies requires greater peak velocities and displacements of the reaction mass then for higher frequencies. Typically, the lowest frequency that can be produced by a vibrator at a fixed force level is determined by the maximum stroke length possible for the reaction mass, and the amount of time that the seismic vibrator can spend at low frequencies is determined by the amount of hydraulic fluid stored in accumulators at the start of the sweep time and the maximum flow capacity of the hydraulic system.

Prior art seismic vibrators, because of the different factors affecting low-frequency signal, produce seismic sweeps with low intensities for the low frequencies in the seismic sweep. Conventionally, the low content of the low frequencies of the seismic sweep may be addressed by experimentation, trial and error techniques or the like, wherein after an initial seismic sweep performed at the test location, that takes into account geophysical properties of the earth formation to be analyzed, the driving force applied to the reaction mass and/or the displacement of the reaction mass for the particular seismic vibrator are altered to generate a seismic sweep with greater low frequency content. However, such techniques are costly, time consuming and may never generate a seismic sweep with optimum or close to optimum low-frequency content because, among other things, the gradual decrease of the driving force at low frequencies is designed according to signal processing principles and does not take into account the vibrator mechanical and hydraulic specifications.

BRIEF SUMMARY OF THE INVENTION

This invention relates in general to vibroseis and, more specifically, but not by way of limitation, to the enhancement and/or signal strength optimization of low frequency content of seismic signals for use in surveying boreholes and/or subsurface earth formations. In certain embodiments of the present invention, peak reaction mass displacement(s) for a reaction mass in a seismic vibrator for vibroseis data acquisition may be determined in the frequency domain independent of geophysical properties of the ground upon which the seismic vibrator is to be operated and used to design a sweep signal to be input into an earth formation by the seismic vibrator. In one embodiment of the present invention, a sweep-signal processor processes mechanical characteristics of the seismic vibrator and applies a modeling function that models operation of the seismic vibrator in the frequency domain to determine operating instructions for operating the seismic vibrator to produce a sweep signal for inputting into a subsurface, wherein the sweep signal comprises optimized driving force and sweep rate for low frequency content of the sweep signal.

The invention provides systems and methods that provide for controlling the seismic vibrator, that may be a single or multiple vibratory source, to provide enhanced/optimized amplitudes of low frequencies in the sweep signal improving upon the utilization of trial and error and/or experimentation to provide for enhancing frequency content, which methods, among other adverse considerations, may be costly, time consuming and may not provide for complete enhancement of low frequency content of the sweep possible from the seismic vibrator.

BRIEF DESCRIPTION OF THE DRAWINGS

The present invention is described in conjunction with the appended figures.

Figure 1:
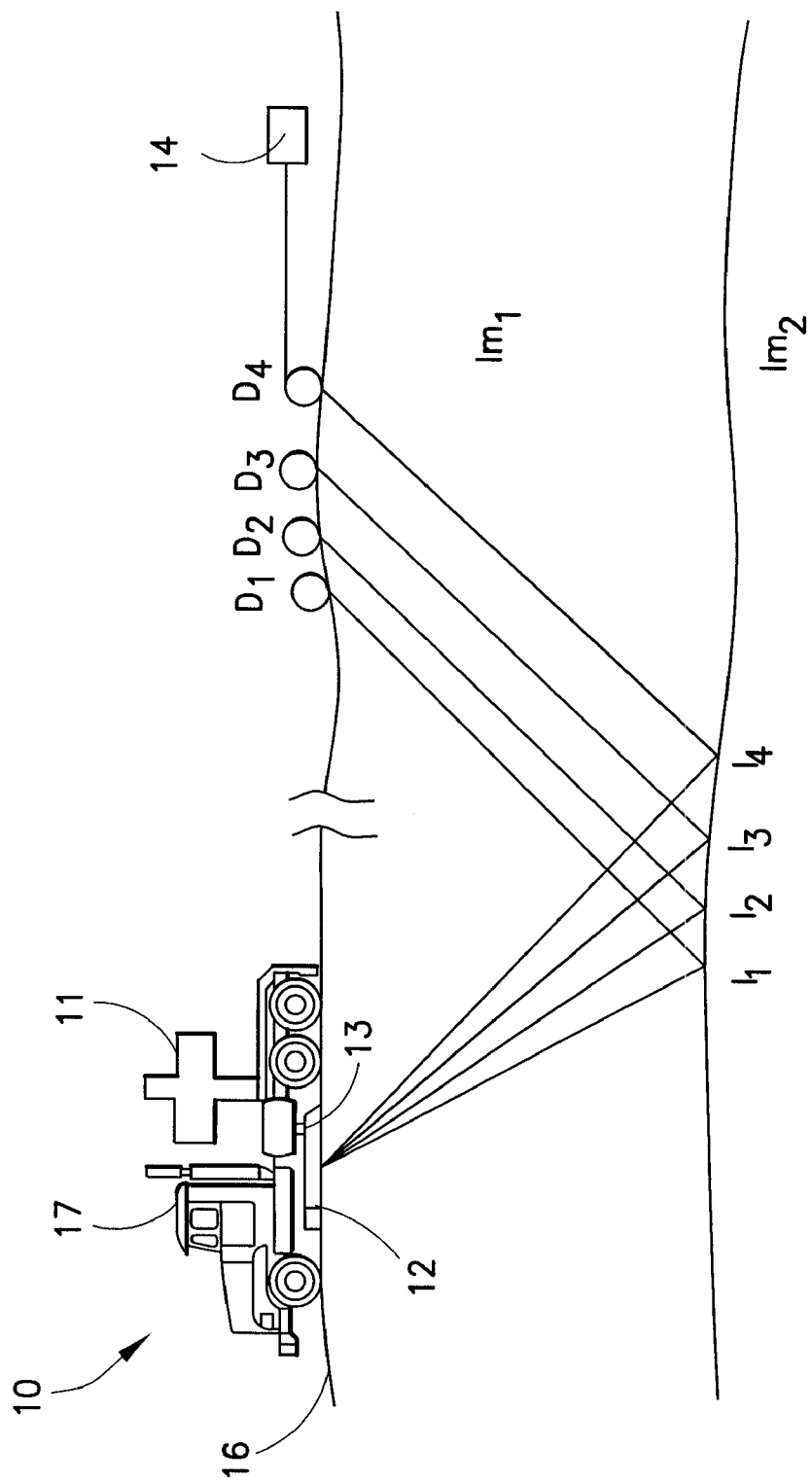
FIG. 1 is a diagram illustrating elements of a vibroseis seismic survey, such as may be used in embodiments of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

This invention relates in general to vibroseis and, more specifically, but not by way of limitation, to the enhancement and/or amplitude optimization of the low frequency content of sweep signals for use in surveying boreholes and/or subsurface earth formations. In embodiments of the present invention, the seismic vibrator may be analyzed a peak displacement of a reaction mass in the seismic vibrator and/or a driving force necessary to drive the reaction mass to the peak reaction mass displacement may be determined in the frequency domain and the determined peak displacement and/or driving force may be applied to the seismic vibrator to produce a sweep signal with enhanced low frequency content for injection into the ground for vibroseis analysis. The peak displacement and/or the driving force may be determined from experimentation and/or modeling functions. In certain aspects, the peak displacement and/or the driving force may be determined independent of any geophysical properties related to operation of the seismic vibrator.

The system of FIG. 1 illustrates in a simplified manner the elements of a vibroseis acquisition system, such as may be used in embodiments of the present invention. In the illustrated system, a seismic vibrator 10 comprises a vibrating element 11, a baseplate 12 and a signal measuring apparatus 13, for example a plurality of accelerometers whose signals are combined to measure the actual ground-force signal applied to the earth by the seismic vibrator. The seismic vibrator 10 illustrated in FIG. 1 is constructed on a truck 17 that provides for maneuverability of the system. As illustrated, the vibrating element 11 is coupled with the baseplate 12 to provide for the transmission of vibrations from the vibrating element 11 to the baseplate 12. The baseplate 12 is positioned in contact with an earth surface 16 and because the baseplate 12 is coupled with the strikeplate 15, the vibrations of the vibrator 11 are communicated into the earth surface 16.

The seismic signal that is generated by the vibrating element 11 and emitted into the earth, via the baseplate 12, may be reflected off the interface between subsurface impedances Im1 and Im2 at points I1, I2, I3, and I4. This reflected signal is detected by geophones D1, D2, D3, and D4, respectively. The signals generated by the vibrating element 11 on the truck 10 are also transmitted to a data storage 14 for combination with raw seismic data received from geophones D1, D2, D3, and D4 to provide for processing of the raw seismic data. In operation a control signal, referred to also as pilot sweep, causes the vibrating element 11 to exert a variable pressure on the baseplate 12.

Figure 2A:
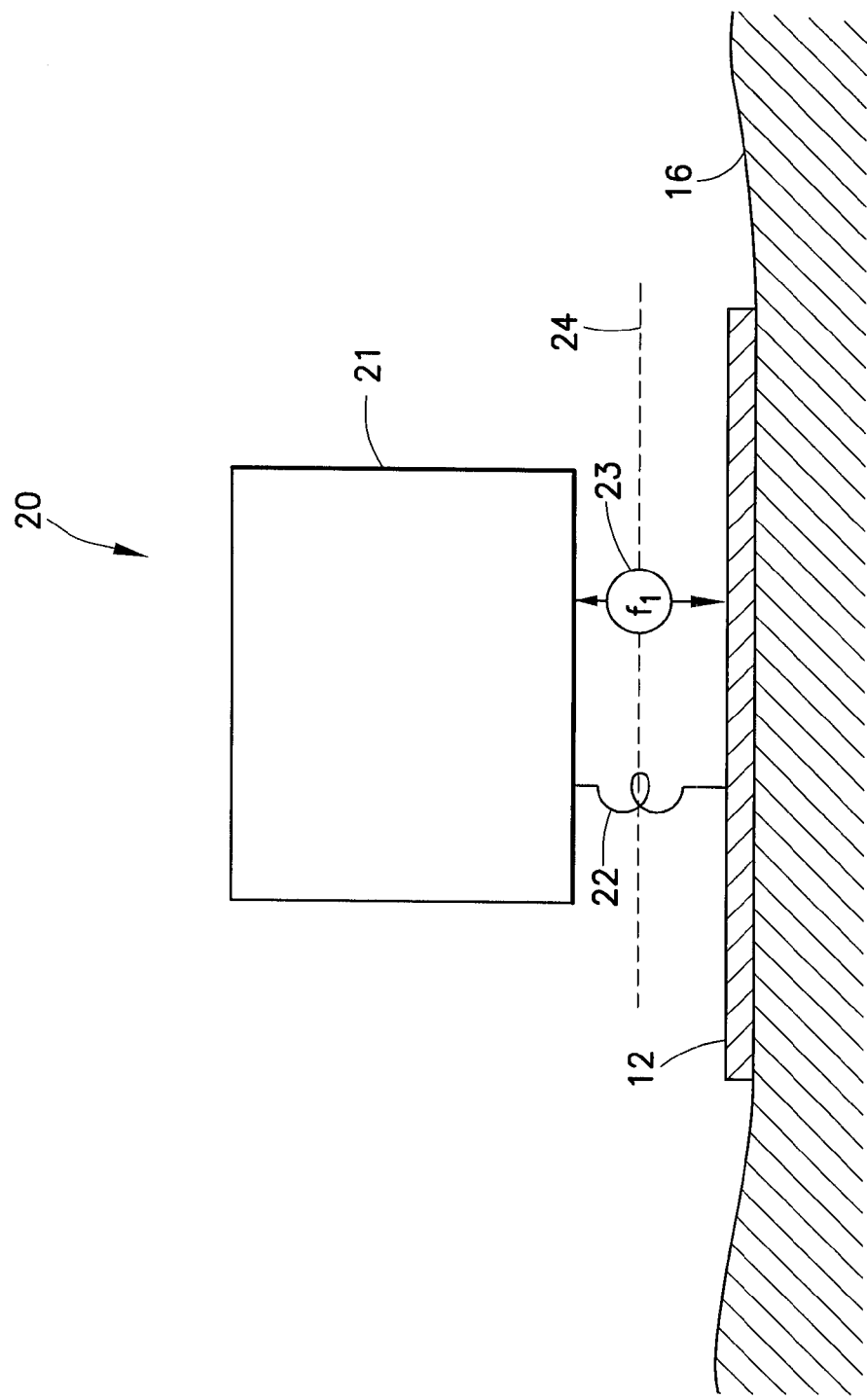
FIG. 2A is a mechanical model of a simple seismic vibrator, such as may be used in embodiments of the present invention, illustrating major components of a seismic vibrator and driving and reactionary type forces between the depicted components.

FIG. 2A is a mechanical model of a simple seismic vibrator, such as may be used in embodiments of the present invention, illustrating major components of a seismic vibrator and driving and reactionary type forces between the depicted components. As illustrated, a seismic vibrator 20 comprises a reaction mass 21 coupled with the baseplate 12 that is in contact with the earth surface 16. A driving force f1 23 is applied to the reaction mass 21 by a driving mechanism (not shown). A flexible support mechanism 22 may be used as a means to support the reaction mass 21 in a neutral position 24. The flexible support mechanism 22 may be a mechanism that both supports the reaction mass 21 and provides for displacement of the reaction mass 21 about the neutral position 24. Merely by way of example, the flexible support mechanism 22 may be a spring, a coil, a hydraulic support and/or the like. In some embodiments, the flexible support mechanism 22 may not be included and the reaction mass 21 may be directly driven into a periodic-type motion about the neutral position by a driving mechanism.

In certain aspects of the present invention, the neutral position 24 may be a position where the reaction mass 21 is positioned in close proximity to but not in contact with the baseplate. In other aspects, the neutral position 24 may be a position where the reaction mass 21 is positioned so as to be remote from the baseplate 12 and the vibrational waves produced by the reaction mass 21 may be transmitted to the baseplate 12 by a coupling structure (not shown) coupling the reaction mass 21 to the baseplate 12. For vibroseis of substrata beneath the earth surface 16, the driving mechanism may apply the force f1 23 in a periodic manner so as to cause the reaction mass 21 to vibrate about the neutral position 24 and cause the emission of vibrations into the earth surface 16, via the baseplate 12.

Figure 2B:
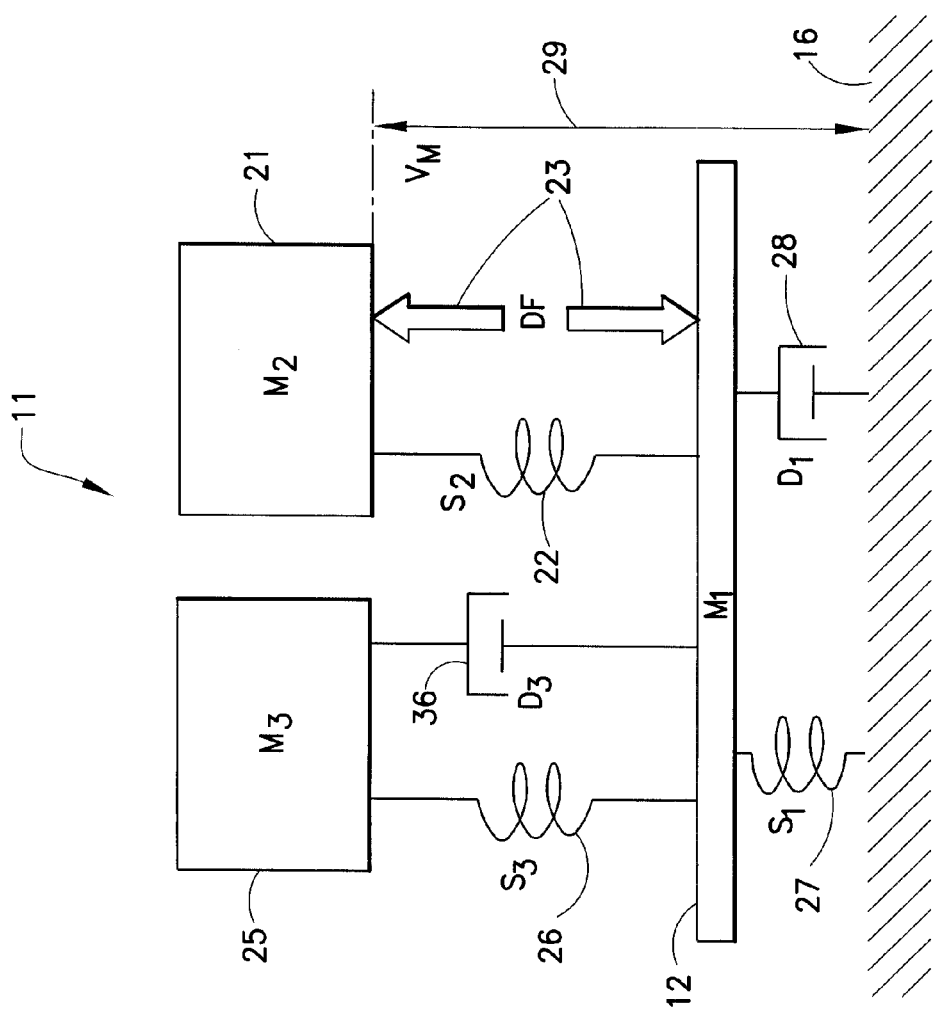
FIG. 2B is a mechanical model of a seismic vibrator with a hold down mass, such as may be used in embodiments of the present invention, illustrating major components of the seismic vibrator and driving and reactionary type forces between the depicted components and at the contact between the seismic vibrator and the earth surface.

FIG. 2B is a mechanical model of a seismic vibrator with a hold down mass, such as may be used in embodiments of the present invention, illustrating major components of the seismic vibrator and driving and reactionary type forces between the depicted components and at the contact between the seismic vibrator and the earth surface. In certain embodiments of the present invention, the reaction mass 21 may be supported by the flexible support mechanism 22 and the driving force 23 may be applied to the reaction mass 21 by a driving mechanism (not shown) that may cause the reaction mass 21 to vibrate. In an embodiment of the present invention, when the driving force 23 is applied to the reaction mass 21, the sum of the forces acting on the base plate 12 may be directed downward and, therefore, the baseplate 12 may apply a positive pressure on the earth surface 16 provided the acceleration of the reaction mass 21 does not exceed gravity. However, during operation of the seismic vibrator 11, the driving force 23 may be such that acceleration of the reaction mass 21 may be about 3 or 4 times gravity. As such, a hold-down weight 25 may be used to hold the baseplate 12 in contact with the ground during operation of the seismic vibrator 11. In an embodiment of the present invention such as depicted in FIG. 1, the weight of the truck 17 may act to hold the baseplate 12 in contact with the earth surface 16.

In certain embodiments of the present invention, an isolation mechanism 26 may be used to couple the hold-down weight 25 to the baseplate 12. The isolation mechanism 26 may provide for coupling the hold-down weight 25 to the baseplate 12 and also provide for isolating and/or damping, at least in part, the baseplate 12 from the hold-down weight 25. Isolation and/or damping of the hold-down weight 25 from the baseplate 12 may serve to prevent any motion of the hold-down weight 25 causing interference with the vibration of the baseplate 16 generated by the motion of the reaction mass 21. The isolation mechanism 26 may be a spring type structure, flexible connector and/or the like. Due to the flexible support mechanism 22 and the isolation mechanism 26, there are connections between the baseplate 12 and both the reaction mass 21 and the hold-down weight 25 that may provide for transmission of vibrations between the three components.

An isolation dashpot 36 is shown in FIG. 2B to depict damping and frictional losses that may occur between the coupling, the isolation mechanism 26, of the baseplate 12 and the hold-down weight 25. Similarly, an earth-surface-reaction spring 27 and an earth-surface-reaction dashpot 28 are shown in FIG. 2B to depict the reaction of the earth surface 16 to the motion of the baseplate 16. The earth-surface-reaction spring 27 and the earth-surface-reaction dashpot 28 represent the impedance of the earth surface to the motion of the baseplate 16, where the impedance may depend upon the elasticity and other physical properties of the earth surface 16. In FIG. 2B, Vm 29 represents the velocity of the reaction mass 21 resulting from application of the driving force 23 to the reaction mass 21.

Figure 2C:
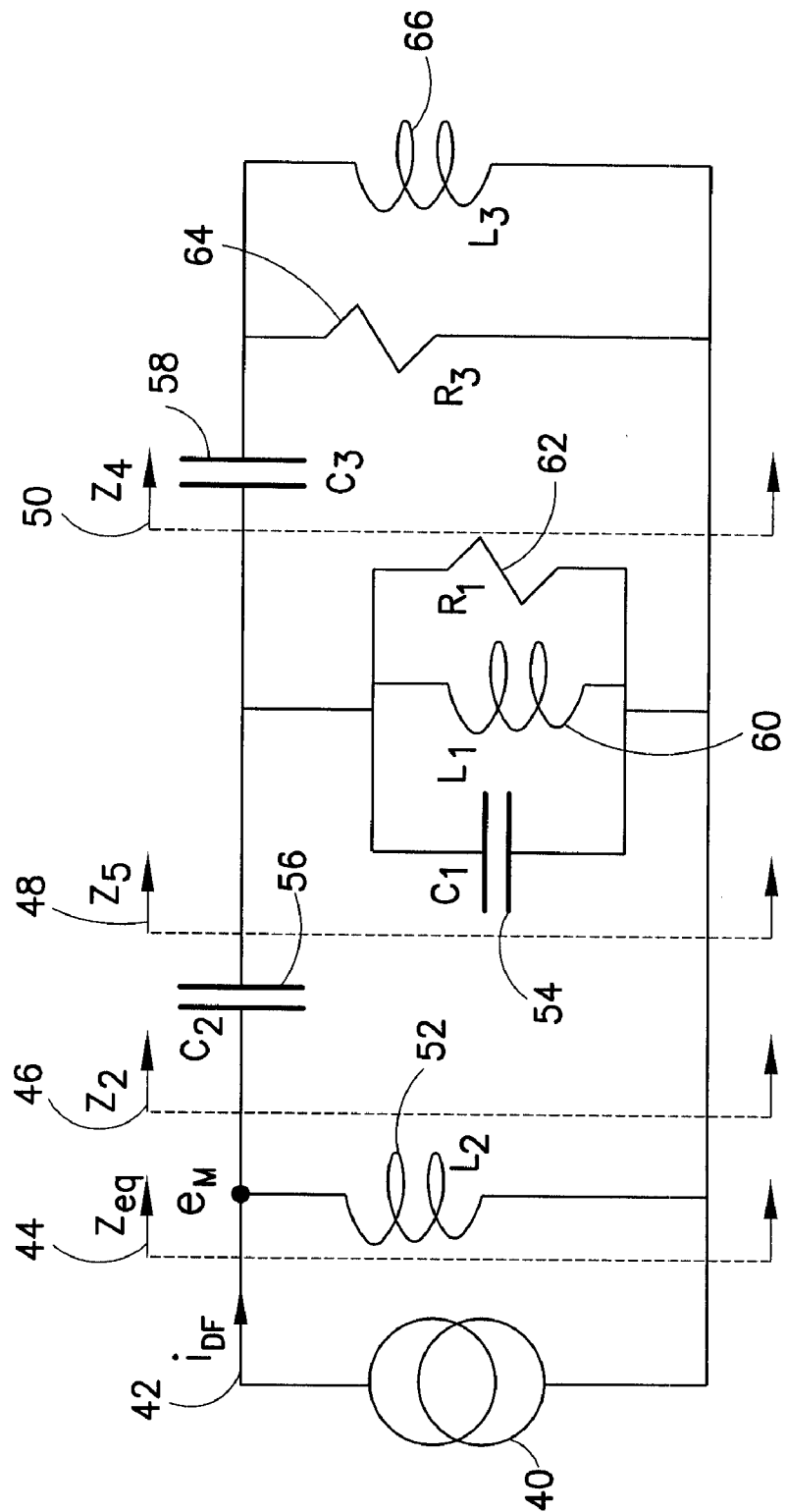
FIG. 2C is a schematic of an electronic circuit equivalent to the mechanical model of the seismic vibrator depicted in FIG. 2B that may be used to derive a relationship between peak reaction mass displacement and driving force in the frequency domain, in accordance with an embodiment of the present invention.

FIG. 2C is a schematic of an electronic circuit equivalent to the mechanical model of the seismic vibrator depicted in FIG. 2B that may be used to derive a relationship between peak reaction mass displacement and driving force in the frequency domain, in accordance with an embodiment of the present invention. In FIG. 2C, capacitor C1 54 represents the mass of the baseplate 12, solenoid L1 60 represents damped compliance of the earth surface 16, and resistor R1 62 represents conductance of the earth damping. Similarly, capacitor C2 56 represents the mass of the reaction mass 21, solenoid L2 represents damping produced by the flexible support mechanism 22, capacitor C3 58 represents the mass of the hold-down weight 25, solenoid L3 66 represents the damping produced by the isolation mechanism 26 and resistor R3 64 represents the damping losses of the isolation mechanism 26. In practice, the damping losses of the isolation mechanism 26 are negligible and may be neglected for modeling purposes. The table below cross-correlates the mechanical and electrical symbols (with the appropriate units) of FIGS. 2B and 2C.

| Electrical symbol | Mechanical symbol | Quantity | Unity | Description |
|---|---|---|---|---|
| $L_1$ | $1/s_1$ | $3 \cdot 10^{-8}$ | $mN^{-1}$ | Earth compliance |
| $L_2$ | $1/s_2$ | $1.6 \cdot 10^{-6}$ | $mN^{-1}$ | Reaction mass suspension compliance |
| $L_3$ | $1/s_3$ | $2.6 \cdot 10^{-7}$ | $mN^{-1}$ | Hold-down isolator's total compliance |
| $C_1$ | $M_1$ | 1350 | Kg | Baseplate mass |
| $C_2$ | $M_2$ | 3015 | Kg | Reaction mass |
| $C_3$ | $M_3$ | 22500 | Kg | Hold-down mass |
| $R_1$ | $1/D_1$ | $2 \cdot 10^{-6}$ | $ms^{-1}N^{-1}$ | Conductance of earth damping |
| $R_3$ | $1/D_3$ | Infinite | $ms^{-1}N^{-1}$ | Conductance of isolator damping |
| $I_{DF}$ | DF | 193000 | N | Rms driving force |

In embodiments of the present invention, the electronic circuit illustrated in FIG. 2C may be used to derive a modeling function for a particular seismic vibrator from which a value of the minimum frequency at which the maximum driving force can be used without exceeding the reaction mass maximum displacement; the reaction mass maximum displacement being a quantity that is a feature of the design of the seismic vibrator that may be provided by the manufacturer of the seismic vibrator, determined experimentally and/or determined theoretically. Displacement of the reaction mass 21 may be measured from a location where the reaction mass 21 is at rest, may be measured from the neutral position 24 or may be measured from a position where the reaction mass 21 is at its closest proximity to the baseplate 12. The modeling function may be used to derive a model for the reaction mass displacement as a function of frequency and provide for a determination of the sweep phase and driving force at low frequencies that permits the transmission of maximum energy into the ground given the mechanical constraints of the seismic vibrator.

For purposes of modeling the seismic vibrator, $f_{md}$ may be used to represent the minimum frequency at which the maximum driving force (DF) can be used without exceeding the reaction mass maximum displacement. As such, in certain embodiments, the driving force used to avoid exceeding the maximum stroke that may be applied to the reaction mass 21 at frequencies lower than $f_{md}$ may be approximated by:

$$DF(f) = DF(f_{md})\frac{f^2}{f_{md}^2} \text{ for } f \leq f_{md} \quad (1)$$
$$= DF(f_{md}) \text{ for } f > f_{md}.$$

where equation (1) may be derived from the equivalent electrical circuit of the basic vibrator.

In FIG. 2C, a current generator 40 generates a current iDF 42. The current iDF 42 may be used in a modeling analysis to represent the driving force DF applied to the reaction mass 21. The current iDF 42 'sees'—is subject to—an impedance that may be dependent upon the mass of the reaction mass 21, the reaction mass suspension compliance, the mass of the baseplate 12 and/or near-surface elastic properties of the earth surface 16, which may be considered as a combination of two parameters such as earth/soil compliance and earth/soil damping. The transfer function between the reaction mass velocity Vm 39 and DF, which for modeling purposes may be considered to be the impedance seen in the electrical circuit illustrated in FIG. 1C by the current generator iDF, is, in accordance with electrical properties of a circuit, given by:

$$Z_{eq} = \frac{e_M}{i_{DF}} = \frac{1}{\frac{1}{Z_2} - i\left(\frac{S_2}{\omega}\right)}, \quad (2)$$

where:

$$Z_2 = Z_5 - i\left(\frac{1}{\omega M_2}\right), \quad (3)$$

$$Z_5 = \frac{Z_1 Z_4}{Z_1 + Z_4}, \quad (4)$$

$$Z_1 = \frac{1}{D_1 + i\left(\omega M_1 - \frac{S_1}{\omega}\right)}, \quad (5)$$

$$Z_4 = i\left(\frac{\omega}{S_3} - \frac{1}{\omega M_3}\right). \quad (6)$$

Zeq may be dominated at low frequencies by the reaction mass 21, or for modeling purposes in the equivalent electrical circuit shown in FIG. 3C, by the sum of the conductances of capacitor C2 56 and solenoid L2 52. The modeling function of certain embodiments of the present invention make use of the fact that for many seismic vibrators, Zeq at low frequencies, i.e. frequencies less than about 10 Hz, is essentially independent of the compliance and/or damping factors of the earth that is in contact with the seismic vibrator. In such embodiments, the reaction mass displacement in the frequency domain may be modeled by the following modeling function:

$$X_m = \frac{Z_{eq}DF}{i\omega}. \quad (7)$$

In an embodiment of the present invention, modeling of the reaction mass displacement in the frequency domain may be performed using a parabolic approximation of the modeling function of equation (7), according to the following:

$$X_m = X_m(f_{MD})\frac{f_{MD}^2}{f^2}, \qquad (8)$$

In embodiments of the present invention, the modeling function of equation (7) and the parabolic approximation of equation (8) may be used to derive the driving force profile of equation (1) to provide that the driving force applied to the reaction mass in the seismic vibrator does not exceeding the maximum displacement. Equation (1) may thus be used to design the low-frequency end of the frequency sweep for a given actuator energy spectral density (esd(f)). It may be noted, however, that the ground-force and the energy spectral density actually put into the ground may be exactly derived only if the properties of the soil/earth on which the seismic vibrator is located are known. The necessary sweep rate SR(f) to obtain esd(f) may be determined according to the following equation:

$$SR(f) = 4\frac{esd(f)}{DF^2(f)}[s/\text{Hz}]. \qquad (9)$$

The time at which the instantaneous frequency $f_i$ is put into the ground may be determined according to the following:

$$t_i(f_i) = \int_{f_{min}}^{f_i} SR(f)df \qquad (10)$$

where $f_{min}$ is the minimum frequency of interest and $t_i(f_i)$ is a monotonic function of $f_i$ that may be numerically inverted to obtain the time dependent instantaneous frequency put into the ground—$f_i(t)$. Finally, the sweep amplitudes may be represented by the following:

$$a(t)=DF(f_i(t))\sin(2\pi\int_0^t f_i(t)dt+\alpha), \qquad (11)$$

where $\alpha$ is the user defined initial phase.

In certain embodiments where the energy requirements lead to long sweeps, i.e. high value of $t_i$ ($f_{max}$) because a long time is spent sweeping at low-frequencies, more vibrators may be used to obtain the required sweep.

In another embodiment of the disclosed invention, the driving force profile is designed using the non-approximated reaction mass displacement according to equation (7). In such an embodiment, the design of the sweep rate may be identical to that described above using the parabolic approximation of the reaction mass displacement from equation (8). Embodiments of the present invention may only requires a user to input only geophysical and mechanical specifications for the seismic vibrator, which may be available from spreadsheets provided by the manufacturer of the seismic vibrator to obtain a driving force profile for a sweep with enhanced low-frequency content. As discussed above, because the earth/soil characteristics may be negligible. In contrast, existing methods for determining operation characteristics for seismic vibrators to generate sweep frequencies may require feedback and adjustment and/or specifications defined in the frequency domain, e.g. the desired power spectrum and in the time domain, e.g. the actuator force envelope, the latter being something that is not exactly known.

Figure 3:
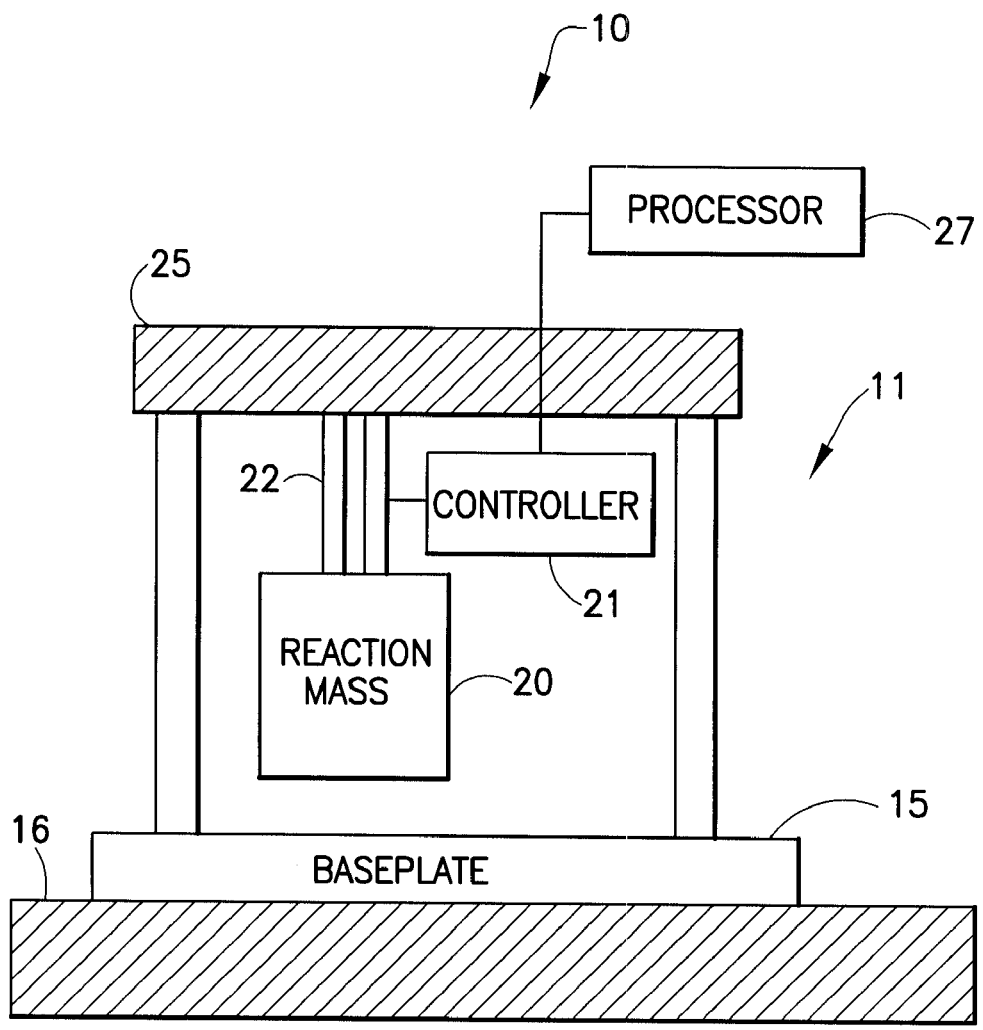
FIG. 3 is a block diagram of a system for producing a sweep signal with enhanced low frequency content, in accordance with an embodiment of the present invention.

FIG. 3 is a block diagram of a system for producing a sweep signal with enhanced low frequency content in accordance with an embodiment of the present invention. In an embodiment of the present invention, the seismic vibrator 10 comprises the reaction mass 21 that is driven into motion by a driving force mechanism 22. The driving force mechanism 22 may be a hydraulic mechanism, a piston mechanism and/or the like. When driven into motion the reaction mass 20 makes vibrates about a position of rest. In an embodiment of the present invention, the baseplate 12 provides a contact between the seismic vibrator 10 and the earth surface 16 through which vibrational wavetrains (seismic sweeps) may be emitted into the subsurface of the earth.

In certain aspects, the motion of the reaction mass 20 may cause the baseplate 12 to come out of contact with the earth surface 16 and, as such, the hold-down weight 25 may be coupled with the base plate 12 to keep the baseplate 12 in contact with the earth surface 16. The driving force mechanism 22 may move the reaction mass in a periodic type motion to create vibrations with different frequencies and these vibrations may be transferred into the earth surface 16 by the baseplate 12. The driving force mechanism 22 may displace the reaction mass 20 periodically about a position where the reaction mass is at rest. The seismic vibrator 10 may be configured so that for each vibrational frequency of the reaction mass 21 there may be a maximum displacement that the reaction mass 21 may be displaced from the rest position and/or the baseplate 12; where the maximum displacement is the limit that the reaction mass 20 may be displaced so that the driving mechanism 22 can function at the frequency and/or the baseplate 12 may be maintained in contact with the earth surface 16.

In an embodiment of the present invention, physical characteristics regarding the seismic vibrator 10 may be entered into a processor 27. The physical characteristics may comprise driving forces obtainable from the driving mechanism 22, maximum possible displacement of the reaction mass 20 for one or more frequencies, peak displacement of the reaction mass 20 and the mean frequency for the peak displacement—where the peak displacement is the utmost displacement of the reaction mass possible with the seismic vibrator 10 for useable operation of the seismic vibrator 10—frequency limitations of the seismic vibrator and/or the like. The physical characteristics may be provided as operating limits of the seismic vibrator 10. The displacement of the reaction mass 20 may be determined from a mean rest position of the reaction mass 20, from a position where the reaction mass 20 is at its closest proximity to the baseplate 23 or the like.

In an embodiment of the present invention, the processor 27 may use a modeling function to process the physical characteristics to determine maximum displacement of the reaction mass 20 for the low-frequency outputs that the seismic vibrator 10 may generate. In certain aspects, the processor 27 may use the modeling function described in equation (7) to determine maximum displacements for the reaction mass 20 for the low-frequencies that the seismic vibrator 10 may produce. In other aspects, the processor 27 may use a parabolic approximation of equation (7) to ascertain the maximum displacements for the reaction mass 20 for the low-frequencies that the seismic vibrator 10 may produce. In some embodiments of the present invention, the processor 27 may generate a seismic sweep for maximizing low frequency content without receiving any data concerning the physical properties of the earth surface 16. In other embodiments, physical properties of the earth surface 16, such as elasticity, damping and/or the like may be input into the processor 27 and the processor 27 may apply these physical properties to the modeling function to generate a seismic sweep maximizing low frequency content.

The processor 27 may use the modeling function to generate a wavetrain/frequency-sweep wherein the wavetrain/frequency-sweep is bounded by a displacement envelope with the maximum possible displacement for each frequency in the wavetrain/frequency-sweep for the reaction mass 20 of the seismic vibrator 10. This frequency sweep may be communicated from the processor 27 to the controller 21 to provide that the driving mechanism 22 drives the reaction mass 20 to output an output wavetrain/frequency sweep into the earth surface 16 where each of the output frequencies of the output wavetrain/frequency sweep has an amplitude close to the maximum possible amplitude, the envelope, available from the seismic vibrator 10. In certain aspects, to reduce processing requirements, costs and or time, the processor 27 may only model low frequencies and provide low frequency parameters that may be added to a standard seismic sweep. In this way, the processor 27 may provide for enhancing the low frequency content of the standard seismic sweep. Merely by way of example, the processor 27 may model maximum reaction mass displacement for frequencies of 10 hertz or less.

Figure 4:
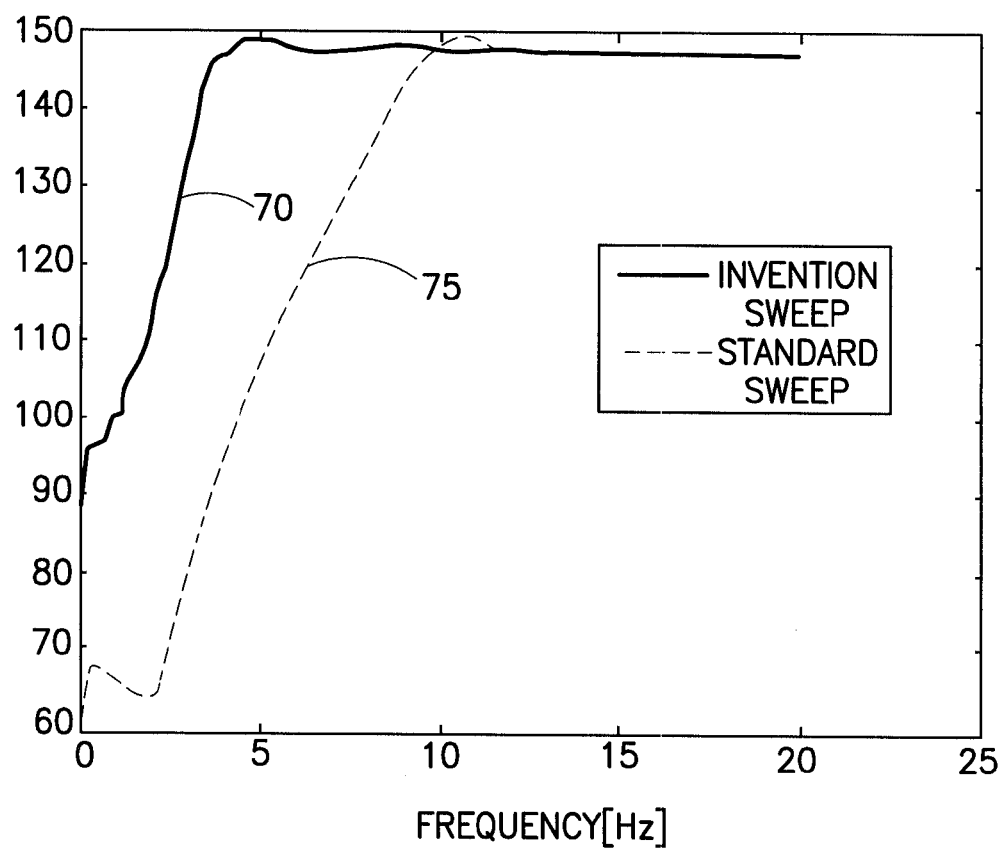
FIG. 4 illustrates a sweep with enhanced low frequency content produced by a seismic vibrator, in accordance with an embodiment of the present invention and a sweep produced by a conventional seismic vibrator.

FIG. 4 illustrates a sweep with enhanced low frequency content produced by a seismic vibrator in accordance with an embodiment of the present invention and a sweep produced by a conventional seismic vibrator. In an embodiment of the present invention, maximum reaction mass displacement for one or more low frequency vibrations is modeled and this information is applied to a frequency sweep to provide an output sweep 70 from the seismic vibrator that has maximum output form the low frequencies compared to a standard sweep without reaction mass displacement modeling.

Figure 5:
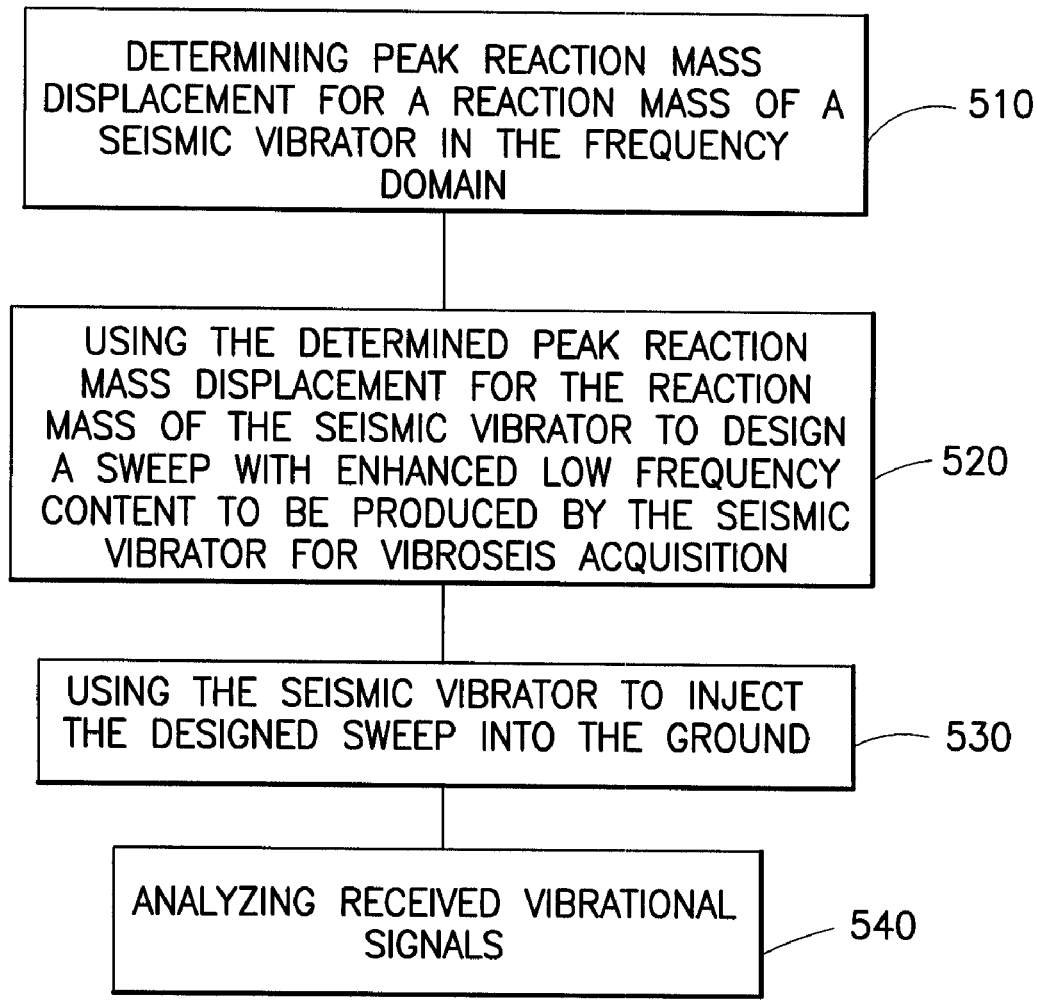
FIG. 5 is a flow-type diagram for using physical properties of a seismic vibrator independent of geophysical considerations to produce a sweep with enhanced low content, in accordance with an embodiment of the present invention.

FIG. 5 is a flow-type diagram for operating a seismic vibrator to produce a sweep with enhanced low frequency content, in accordance with an embodiment of the present invention. In step 510, the physical properties of the seismic vibrator may be analyzed and peak reaction mass displacement characteristics for the reaction mass of the seismic vibrator may be determined in the frequency domain. The peak reaction mass displacement characteristics may be the peak reaction mass displacement for a frequency that may be attained from the seismic vibrator. As persons of skill in the art may appreciate, peak reaction mass displacement may be related to the driving force applied to the reaction mass.

In certain aspects, the peak reaction mass displacement for a frequency may be experimentally determined for a particular seismic vibrator. Experiments may be performed for one or more of the frequencies to be used in a vibroseis sweep and the peak reaction mass displacement may be determined for the one or more frequencies. Experiments may be performed for operating the seismic vibrator so as to produce the low frequencies of the vibroseis sweep. Alternatively or in combination with the preceding, peak reaction mass displacement for a plurality of frequencies in a vibroseis sweep may be determined and a functional approximation may be fitted to the results and used as a modeling function for determination of peak reaction mass displacement for one or more of the frequencies in the vibroseis sweep. In other aspects, the peak reaction mass displacement may be determined from a modeling function modeling the operation of the seismic vibrator, such as reproduced above in equation (7). In embodiments of the present invention, the experimental determination of the peak reaction mass displacement in the frequency domain, the functional approximation of the peak reaction mass displacement in the frequency domain and/or the use of a modeling function to determine the peak reaction mass displacement in the frequency domain for a seismic vibrator may each be determined without consideration of geophysical properties of the earth formation and/or the borehole to be surveyed.

In step 520, the peak reaction mass displacement for the reaction mass of the seismic vibrator for one or more frequencies may be used to determine operational settings for the seismic vibrator to produce a vibroseis sweep, wherein by using peak reaction mass displacement the energy injected into the ground in the sweep is enhanced. In embodiments of the present invention, the seismic vibrator may be driven according to the parameters determined in step 510 to provide for low frequency content of the vibroseis to be produced by the seismic vibrator for injection of a vibroseis sweep into the ground, wherein the vibroseis sweep may have enhanced low frequencies content.

In step 530, the reaction mass of the seismic vibrator is driven by the determined driving forces so as to inject the sweep into the ground with enhanced low frequency content. In step 540, the vibrational signal received by a receiver from the sweep injected into the ground may be analyzed and the earth formation and/or borehole may be analyzed.

While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A method for enhancing low frequency content of a frequency-sweep signal emitted by a seismic vibrator into a substrata below an earth surface for seismic surveying of an earth formation or a borehole, the method comprising the steps of:
   determining a peak reaction mass displacement of a reaction mass in the seismic vibrator for one or more frequencies of the frequency sweep signal; and
   configuring a drive signal for driving the seismic vibrator to produce the frequency-sweep signal and to inject the frequency-sweep signal into the earth formation, wherein the drive signal provides for driving the reaction mass in the seismic vibrator at the peak reaction mass displacement for at least one of the one or more frequencies.

2. The method for enhancing low frequency content of the frequency-sweep signal emitted by the seismic vibrator into the substrata below the earth surface for seismic surveying of the earth formation or the borehole as recited in claim 1, wherein the determining the peak reaction mass displacement of the reaction mass in the seismic vibrator for one or more frequencies of the frequency sweep signal is determined independent of the geophysical properties of the earth formation or the borehole.

3. The method for enhancing low frequency content of the frequency-sweep signal emitted by the seismic vibrator into the substrata below the earth surface for seismic surveying of the earth formation or the borehole as recited in claim 1, wherein the peak reaction mass displacement for the one or more frequencies of the frequency sweep signal is determined experimentally.

4. The method for enhancing low frequency content of the frequency-sweep signal emitted by the seismic vibrator into the substrata below the earth surface for seismic surveying of the earth formation or the borehole as recited in claim 3, wherein a function is approximated to the peak reaction mass displacement for the one or more frequencies and used to extrapolate further peak reaction mass displacements for further frequencies in the frequency-sweep signal.

5. The method for enhancing low frequency content of the frequency-sweep signal emitted by the seismic vibrator into the substrata below the earth surface for seismic surveying of the earth formation or the borehole as recited in claim 1, wherein the peak reaction mass displacement for the one or more frequencies of the frequency sweep signal is determined from a modeling function.

6. The method for enhancing low frequency content of the frequency-sweep signal emitted by the seismic vibrator into the substrata below the earth surface for seismic surveying of the earth formation or the borehole as recited in claim 5, wherein the modeling function is derived from an electrical circuit equivalent to the seismic vibrator.

7. A method for enhancing low frequency content of a frequency-sweep signal emitted by a seismic vibrator into a substrata below an earth surface for seismic surveying of an earth formation or a borehole, the method comprising the steps of:

receiving physical specifications for the seismic vibrator, wherein the seismic vibrator comprises at least:
  a baseplate configured to form a contact between the seismic vibrator and the earth surface;
  a reaction mass coupled with the baseplate;
  a drive system coupled with the reaction mass and configured to apply a force to the reaction mass, wherein the drive system is configured to vibrate the reaction mass at a vibrating frequency, and wherein during a vibration cycle the reaction mass is driven by the drive system into a vibrational motion around a rest position; and
  a control mechanism coupled with the drive system and configured to control the vibrating frequency of the reaction mass;

using a processor to process the physical specifications to generate a drive signal, wherein the processor processes the drive signal from a modeling function that models a maximum displacement of the active mass from the rest position in a frequency domain, and wherein the drive signal comprises a signal for operating the seismic vibrator to produce the frequency-sweep signal with enhanced low frequency content; and applying the drive signal to the control mechanism.

8. The method as recited in claim 7, wherein the modeling function is independent of physical properties of the earth surface.

9. The method as recited in claim 7, wherein the mechanical specifications comprise at least a peak displacement of the reaction mass and a mean frequency at which the peak displacement occurs, and wherein the peak displacement comprises a largest possible displacement of the reaction mass from the strike plate that the seismic vibrator is capable of producing.

10. The method as recited in claim 7, wherein the modeling function is a function relating maximum reaction mass displacement of the reaction mass from the rest position in a frequency domain to driving force applied to the reaction mass and impedance to motion of the reaction mass.

11. The method as recited in claim 7, wherein the processor processes the drive signal from the mechanical specifications and a parabolic approximation of the modeling function.

12. The method as recited in claim 7, wherein the drive signal is configured to enhance amplitudes of frequencies of less than ten hertz in the frequency sweep.

13. A system for emitting a frequency-sweep signal with enhanced low frequency content into substrata beneath an earth surface for seismic surveying of an earth formation or a borehole, comprising:

a seismic vibrator configured to receive a drive signal and to input the frequency-sweep signal into the substrata, wherein the seismic vibrator comprises:
  a baseplate configured to form a contact between the seismic vibrator and the earth surface;
  a reaction mass coupled with the baseplate;
  a drive system coupled with the reaction mass and configured to apply a force to the reaction mass, wherein the drive system is configured to vibrate the reaction mass at a vibrating frequency; and
  a control mechanism coupled with the drive system and configured to control the vibrating frequency of the reaction mass; and a processor capable of communicating with the seismic vibrator and configured to provide a drive signal to the seismic vibrator for driving the reaction mass with a peak reaction mass displacement for at least one or more of the frequencies of the frequency-sweep signal, wherein the drive signal is determined for the seismic vibrator independent of geophysical properties of the earth formation or the borehole.

14. The system for emitting the frequency-sweep signal with enhanced low frequency content into substrata beneath the earth surface for seismic surveying of the earth formation or the borehole as recited in claim 13, wherein the peak reaction mass displacement for the at least one or more frequencies of the frequency-sweep signal is determined experimentally.

15. The system for emitting the frequency-sweep signal with enhanced low frequency content into substrata beneath the earth surface for seismic surveying of the earth formation or the borehole as recited in claim 14, wherein a function is approximated to the peak reaction mass displacement for the one or more frequencies and used to extrapolate further peak reaction mass displacements for further frequencies in the frequency-sweep signal.

16. The system for emitting the frequency-sweep signal with enhanced low frequency content into substrata beneath the earth surface for seismic surveying of the earth formation or the borehole as recited in claim 13, wherein the peak reaction mass displacement for the at least one or more frequencies of the frequency-sweep signal is determined from a modeling function.

17. The system for emitting the frequency-sweep signal with enhanced low frequency content into substrata beneath the earth surface for seismic surveying of the earth formation or the borehole as recited in claim 16, wherein the modeling function is derived from an electrical circuit equivalent to the seismic vibrator.

18. A system for emitting a frequency-sweep signal with enhanced low frequency content into substrata beneath an earth surface for seismic surveying of an earth formation or a borehole, comprising:

a seismic vibrator configured to receive a drive signal and to input the frequency-sweep signal into the substrata, wherein the seismic vibrator comprises:
   a baseplate configured to form a contact between the seismic vibrator and the earth surface;
   a reaction mass coupled with the baseplate;
   a drive system coupled with the reaction mass and configured to apply a force to the reaction mass, wherein the drive system is configured to vibrate the reaction mass at a vibrating frequency; and
   a control mechanism coupled with the drive system and configured to control the vibrating frequency of the reaction mass; and
a processor capable of communicating with the seismic vibrator and configured to receive an input of mechanical specifications of the seismic vibrator and to process the mechanical specifications to generate the drive signal to provide for production by the seismic vibrator of the frequency-sweep signal with enhanced low frequency content, wherein:
   the mechanical specifications comprise at least a peak displacement of the reaction mass and a mean frequency at which the peak displacement occurs;
   the peak displacement comprises a largest possible displacement of the reaction mass from the strike plate that the seismic vibrator is capable of producing; and
   the processor processes the drive signal from the mechanical specifications and a modeling function that models displacement of the reaction mass as a function of the vibration frequency.

19. The system as recited in claim 18, wherein the modeling function is independent of physical properties of the earth surface.

20. The system as recited in claim 18, wherein the modeling function is a function relating maximum reaction mass displacement of the reaction mass from a rest position in a frequency domain to driving force applied to the reaction mass and impedance to motion of the reaction mass.

21. The system as recited in claim 18, wherein the processor processes the drive signal from the mechanical specifications and a parabolic approximation of the modeling function.

22. The system as recited in claim 18, wherein the drive signal is configured to enhance amplitudes of frequencies of less than ten hertz in the frequency-sweep.

* * * * *